(12) United States Patent
Anderson et al.

(10) Patent No.: US 6,622,505 B2
(45) Date of Patent: Sep. 23, 2003

(54) ALTERNATOR/INVERTOR REFRIGERATION UNIT

(75) Inventors: Eugene Thomas Anderson, Bloomington, MN (US); Arnost Hurych, Karlin (CS); Vladimir Sulc, Bloomington, MN (US); Greg Truckenbrod, Fridley, MN (US); Donald J. Bongaards, Shorewood, MN (US); Zdenek Kaiser, Prague (CS)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 10/165,944

(22) Filed: Jun. 10, 2002

(65) Prior Publication Data

US 2003/0000236 A1 Jan. 2, 2003

Related U.S. Application Data

(60) Provisional application No. 60/296,874, filed on Jun. 8, 2001.

(51) Int. Cl.$^7$ .............................. F25B 1/00; F25B 49/00
(52) U.S. Cl. ..................... 62/228.3; 62/323.3; 62/133
(58) Field of Search ........................ 62/323.3, 228.3, 62/230, 236, 133, 180, 181; 417/38; 290/40 C, 40 R, 40 A; 322/28, 90

(56) References Cited

U.S. PATENT DOCUMENTS

| | | | |
|---|---|---|---|
| 4,257,238 A | | 3/1981 | Kountz et al. |
| 4,530,338 A | * | 7/1985 | Sumi .......................... 123/559 |
| 4,629,968 A | | 12/1986 | Butts et al. |
| 4,651,081 A | | 3/1987 | Nishimura et al. |
| 4,663,725 A | | 5/1987 | Truckenbrod et al. |
| 4,667,480 A | * | 5/1987 | Bessler ........................ 62/180 |
| 4,668,872 A | | 5/1987 | Lerouge et al. |
| 4,853,553 A | | 8/1989 | Hosie |
| 4,918,932 A | | 4/1990 | Gustafson et al. |
| 4,973,896 A | | 11/1990 | Shiga et al. |
| 4,977,752 A | | 12/1990 | Hanson |
| 5,086,266 A | | 2/1992 | Shiga et al. |
| 5,209,072 A | | 5/1993 | Truckenbrod et al. |
| 5,295,364 A | | 3/1994 | Truckenbrod et al. |
| 5,390,068 A | | 2/1995 | Schultz et al. |
| 5,561,330 A | | 10/1996 | Crook |
| 5,656,922 A | | 8/1997 | LaVelle et al. |
| 5,818,117 A | | 10/1998 | Voss et al. |
| 5,899,081 A | * | 5/1999 | Evans et al. .................. 62/126 |
| 5,921,090 A | | 7/1999 | Jurewicz et al. |
| 5,929,619 A | | 7/1999 | Chin et al. |
| 6,157,175 A | | 12/2000 | Morinigo et al. |
| 6,367,269 B1 | * | 4/2002 | Hanson et al. ................. 62/126 |
| 2001/0045101 A1 | * | 11/2001 | Graham et al. ............... 62/236 |
| 2002/0104321 A1 | * | 8/2002 | Odaci et al. .................. 62/133 |
| 2002/0112489 A1 | * | 8/2002 | Egawa et al. ................. 62/133 |
| 2002/0112492 A1 | * | 8/2002 | Suitou et al. ................. 62/225 |

* cited by examiner

*Primary Examiner*—Marc Norman
(74) *Attorney, Agent, or Firm*—Michael Best & Friedrich LLP (57) ABSTRACT

A method of powering a refrigeration system. The method includes providing a mover and an alternator, the alternator being coupled to the mover and generating a power signal. The method also includes monitoring at a control a plurality of system parameters and sending a control signal based on the system parameters from the control. The method further includes receiving the power signal and the control signal at an inverter-based device which has a plurality of inverters, converting the power signal into a controlled power signal based on the control signal, and driving a plurality of components of the refrigeration system with the controlled power signal, which are also controlled by the control.

20 Claims, 8 Drawing Sheets

ALTERNATOR/INVERTOR REFRIGERATION UNIT

CROSS REFERENCE TO RELATED APPLICATIONS

This application claims priority under 35 U.S.C. § 119 to provisional patent application Ser. No. 60/296,874, filed on Jun. 8, 2001.

BACKGROUND OF THE INVENTION

Transport refrigeration units are used to maintain a desired temperature in a conditioned load space inside an enclosure used for carrying cargo, such as in a trailer, truck or other transport container. A transport refrigeration unit can be installed on the exterior of the enclosure, outside of the conditioned load space. A typical cargo container is a truck, and a typical mounting site for the transport temperature control unit is above the truck cabat the front wall of the enclosure.

Transport refrigeration units generally include an evaporator assembly that transfers heat from the conditioned load space into a refrigerant, and a condenser assembly that transfers heat from the refrigerant to the outside environment. The evaporator assembly typically includes an evaporator coil and an air-moving apparatus (e.g., a fan). The air-moving apparatus draws relatively warm air from the conditioned load space, passes the air over the evaporator coils, which take heat from the air and return the cooler air to the conditioned load space. The condenser assembly typically includes condenser coils and an air-moving apparatus (e.g., a fan), which draws air from the outside environment over the condenser coils and returns the heated air to the outside environment.

Transport refrigeration units also generally include a refrigerant compressor to pressurize the refrigerant and an expansion valve to depressurize the refrigerant. The evaporator assembly, condenser assembly, compressor and other components in the temperature control unit require a power supply. Conventional transport refrigeration units employ an engine, such as an internal combustion diesel engine, to supply the needed power (for the compressor, fans, valves, etc.). The engine can be separate from the vehicle engine or the vehicle engine itself can be used. If the vehicle engine is used, electrical connections need to be made between the refrigeration unit and the engine's electrical source, usually an alternator. In addition, some units utilize a compressor driven directly by the vehicle engine, requiring pipe connections from the compressor to the refrigeration unit. The potential for leakage or for electrical problems is increased with the increased distance between the refrigeration unit and the engine. Other units utilize a separate engine mounted near the refrigeration unit. This eliminates the leakage problems but introduces new problems. The engine will require additional maintenance and fuel to operate, increasing the costs of operating the unit. Typical vehicle engine-driven air conditioning systems have included inverter circuit components. However, these systems are power supply driven, where the output frequencies of the inverters are adjusted in response to the power supplied to the unit.

SUMMARY OF THE INVENTION

It is generally desirable to make the transport refrigeration unit as compact and as efficient as possible. Both objectives can be advanced by making the powered components of the unit electrically-powered and independently controlled. By making compressor, condenser fans and evaporator fans electrically-powered and independently-controlled, there is no need for a mover in the transport refrigeration unit. Generally speaking, a mover is a device that uses mechanical or chemical energy to drive another component. In the case of a transport refrigeration unit, a mover could include a diesel engine. Frequently a mover drives another device mechanically, by means such as belts and pulleys. A mover and the mover's associated apparatus consume considerable space. If the mover is a diesel engine that drives an electric motor for example, the engine and the motor both take up space, as do the belts and pulleys and other mechanical driving systems.

Components in a transport refrigeration unit that are electrically-powered and independently-controlled can utilize the already existing, and required, vehicle engine as a mover. Using the already existing electrical system allows for the use of efficient self-contained fans and compressors. A condenser fan, for example, can include its own inductive motor, and need not be mechanically driven by a mover. Compressors such as hermetic scroll compressors likewise can include their own electric motors.

However, using the electricity generated by the vehicle engine may be inefficient due to the wide variations in frequency and voltage that occur during normal operation. For example, as the vehicle engine speed increases or decreases, the frequency of the electric power from the corresponding alternator fluctuates. Therefore it is desirable to control the power supply to the differing components to optimize the efficiency of the cooling unit given the limited amount of power that may be available.

Therefore the present invention provides a method of powering a refrigeration system is provided. The method includes providing a mover, and providing an alternator, the alternator being coupled to the mover, and generating a power signal. The method further includes monitoring at a control a plurality of system parameters, and sending a control signal based on the system parameters from the control. Furthermore, the method includes receiving the power signal and the control signal at an inverter-based device, the inverter-based device having a plurality of inverters, and converting the power signal into a controlled power signal based on the control signal. The method also includes driving a plurality of components of the refrigeration unit with the controlled power signal, the components also being controlled by the control.

In another embodiment, a method of power distribution in a temperature controlled transport unit is provided. The method includes providing a primary power signal and converting the primary power signal into a secondary controlled power signal with a plurality of inverters. The inverters are coupled to a control that sends control signals to the inverters. The method further includes driving a plurality of components in the temperature controlled system with the controlled power signal. The components are also controlled by the control.

In still another embodiment according to the present invention, a power distribution system in a temperature controlled transport system is provided. The system includes a mover operatively coupled to an alternator that generates a power signal. The mover is also operatively coupled to a control that monitors a plurality of system parameters and sends a control signal based on the system parameters. The system also includes an inverter-based device operatively coupled to the control, the inverter based device having a plurality of inverters, receiving the power signal and the control signal, and converting the power signal into a controlled power signal based on the control signal. Furthermore, the system includes a plurality of components, the components being driven with the controlled power signal and being controlled by the control.

In the preferred embodiments, the present invention utilizes an alternator coupled to the vehicle engine to provide an alternating current ("AC") power signal. Rectification of the AC power signal creates a direct current ("DC") power signal that is passed through a DC bus voltage controller and then supplied to a pair of inverters. The DC bus voltage controller controls the variable voltage generated by the alternator. Each inverter converts the DC power signal into a controlled AC power signal for driving the components of the refrigeration unit. One AC power signal can be used to drive the compressor, which requires the largest amount of power. The second AC power signal is then used to power the evaporator fan and condenser fan. This arrangement allows for the motors to be run at different speeds and power levels depending on the amount of cooling required and the amount of power that is available from the engine.

The alternator is liquid cooled, with the coolant heat rejected using a heat exchanger incorporated in the refrigeration system condenser coil or, alternatively, in the refrigeration system evaporator coil. The increased cooling efficiency resulting from the use of the refrigeration system heat exchanger or evaporator coil, as opposed to using the vehicle radiator heat exchanger, enables the use of a smaller alternator.

A microprocessor-based control receives and processes a number of input variables and runs a control algorithm to efficiently manage the power supply and electrical load of the system. The control continuously monitors refrigeration system parameters including alternator speed, refrigeration system pressure, watt power transducer values, current power transducer values, refrigeration system suction pressure value, fixed suction pressure value, and condenser and evaporator discharge temperature to determine the current electrical load of the system. The control algorithm continuously establishes: (1) the position of a suction line proportional refrigeration valve; and (2) the inverters' output frequency/voltage. Together, these controlled parameters establish the alternator input power. A predetermined, prime mover speed-dependent utilizable power map is incorporated in the control algorithm. The alternator's input power consumption is made equivalent to the prime mover speed-dependent utilizable power map.

The control algorithm also controls the refrigeration unit high side refrigerant pressure at extreme conditions. A high pressure control set point is input into a control algorithm. Rising refrigerant pressure results in changing the compressor speed with Proportional Integral Derivative ("PID") control to limit the pressure to the set point value. Further required reduction in refrigerant pressure uses a suction line PID controlled refrigerant valve. Other unit performance parameters are continuously monitored to allow for further changes in compressor speed or refrigeration unit suction flow. The control algorithm prevents exceeding the refrigeration pressure set point limit and avoids shut down of the refrigeration unit.

The control algorithm incorporates a soft start power management function. The rate of application of load power to a vehicle engine influences drivability of the vehicle. Using an established load application rate, measured in watts per second, minimizes the influence on vehicle performance. Determination of an acceptable application rate for each vehicle or a rate for all vehicles, optimizes the performance of a vehicle powered refrigeration product, deriving power from a vehicle.

Further objects and advantages of the present inventive transport refrigeration system, together with the organization and manner of operation thereof, will become apparent from the following detailed description of the invention when taken in conjunction with the accompanying drawings, wherein like elements have like numerals throughout the drawings.

Other features and advantages of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
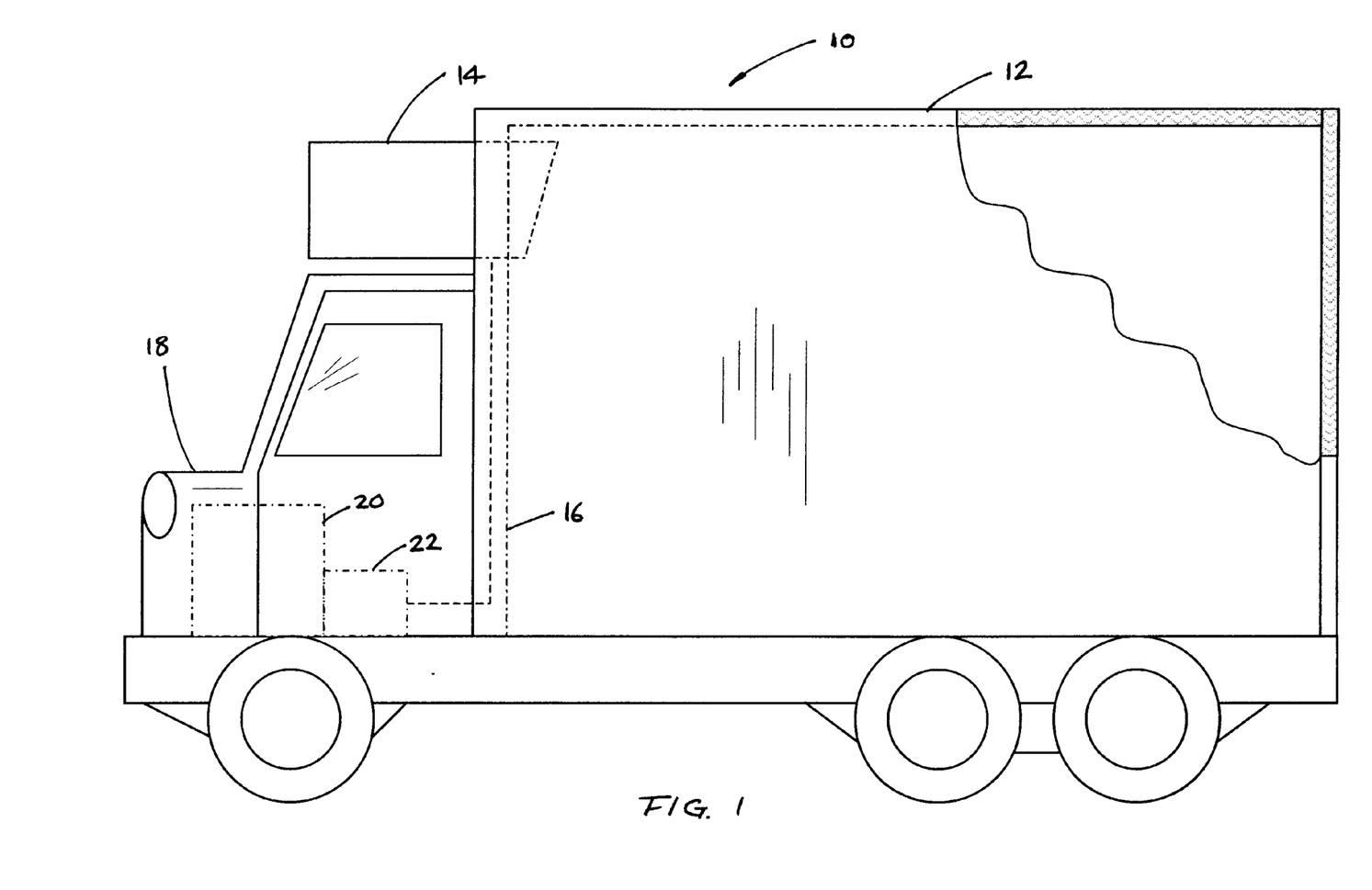
FIG. 1 shows a truck with a transport refrigeration system according to the present invention mounted thereon.

FIG. 1 depicts a temperature-controlled cargo carrier 10 in the form of a straight truck including a conditioned load space 12 for carrying cargo. A transport refrigeration unit 14 according to the present invention according to the present invention mounts to the front wall 16 of the load space 12. The truck 10 further includes a cab 18, which houses an engine 20, such as a diesel engine, that provides power to move the truck 10 and to operate the transport refrigeration unit 14.

Figure 2:
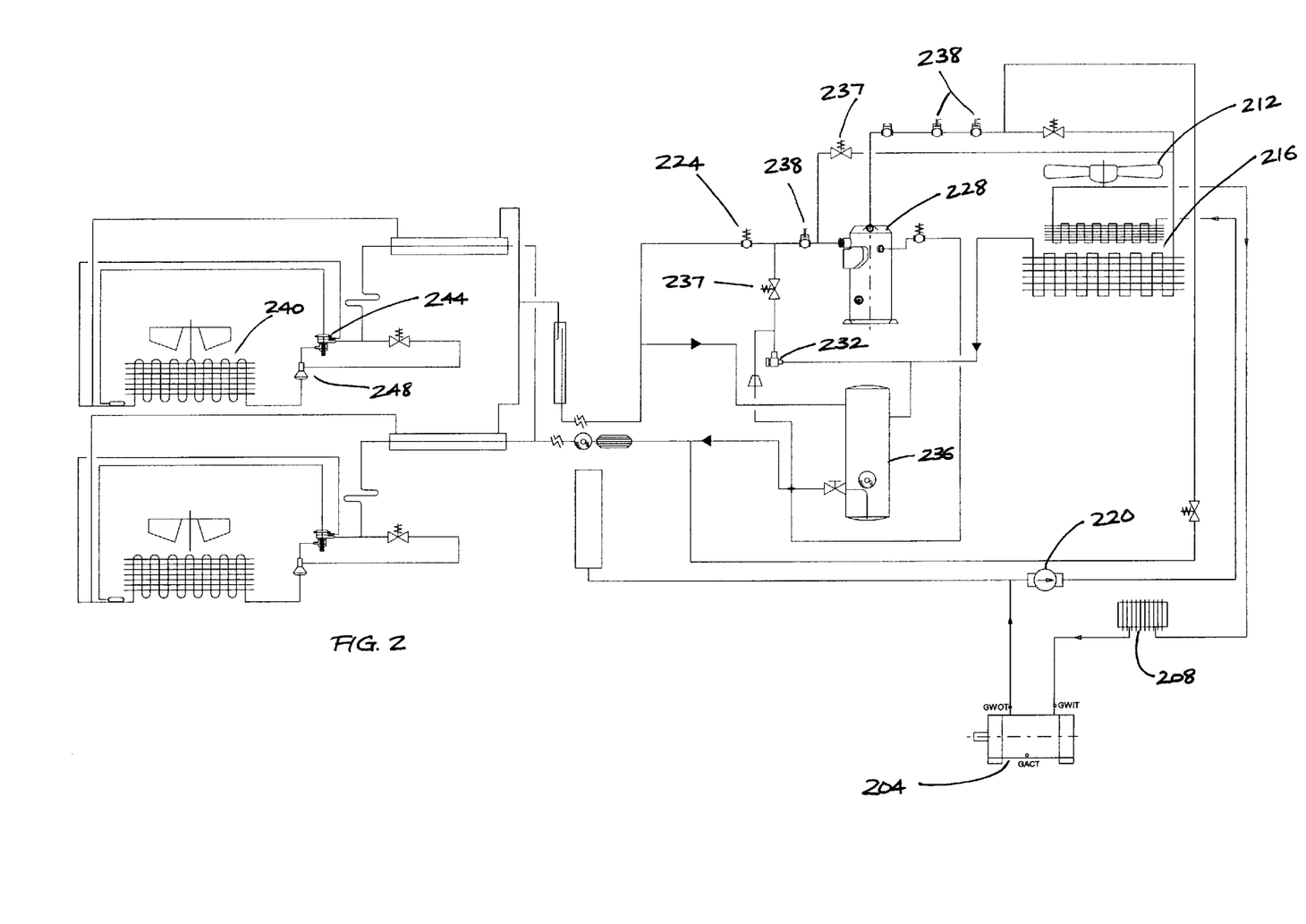
FIG. 2 shows a schematic drawing of the mechanical components of the refrigeration system of FIG. 1.

FIG. 2 shows the mechanical components of the transport refrigeration unit 14 that may be used with the truck 10 as shown in FIG. 1. The prime mover 20, that is, the supplier of energy for the system, is, for example, an engine such as a diesel engine of the truck 10. U.S. Pat. No. 6,367,269, assigned to the same assignee as the present invention and incorporated by reference herein, fully describes the operation of the transport refrigeration system of FIG. 2.

FIG. 2 shows an alternator 204 (component 22 of FIG. 1) of an undermount refrigeration system. The alternator 204, being moved by the prime mover of FIG. 1, generates a power signal that an inverter 208 further regulates and yielding a controlled power signal. The controlled power signal then drives a condenser fan 212 and a heat exchanger or a condenser coil 216, which is further controlled by a coolant pump 220. A suction line proportional refrigeration valve or stepper motor driven valve 224 controls the amount of a refrigerant, such as R404A, that a compressor 228 provides to the condenser coil 216 through a pressure regulator 232, a receiver/accumulator tank 236, and a series of valves 237 and transducers 238. FIG. 2 also shows an evaporator coil 240 controlled by an expansion valve 244 and a refrigerant distributor 248. Although a preferred embodiment of an undermount refrigeration system is shown in FIG. 2, it is understood that, according to the present invention, a nosemount refrigeration system (as shown in FIG. 1) can also use similar system architecture and operations. The controlled operations of a system according to the present invention and for use in either arrangement is detailed hereinafter.

As shown in FIGS. 3–8, a belt drive assembly mechanically couples the diesel engine 20 to a synchronous alternator 22. The belt drive assembly comprises a belt 24 and pulleys 26, 28 and couples a power shaft 30 from the engine 20 to the alternator 22. The alternator 22 is preferably brushless, providing longer wear and greater efficiency, and preferably is an eight-pole alternator, for providing polyphase or three phase alternating current ("AC") output. Because the alternator 22 is a synchronous generator, the AC outputs from the alternator are proportional to the speed imparted by the engine 20. The AC output frequency therefore varies generally from a low of 45 Hz to a high of 75 Hz. The alternator 22 is a compact unit with liquid cooling supplied by the transport refrigeration system's 14 heat exchanger. The coolant heat is rejected using a heat exchanger incorporated in the refrigeration system condenser coil or, alternatively, in the refrigeration system evaporator coil. The increased cooling efficiency of the refrigeration system heat exchanger, as compared to the vehicle radiator heat exchanger, enables the use of a smaller alternator.

Figure 3:
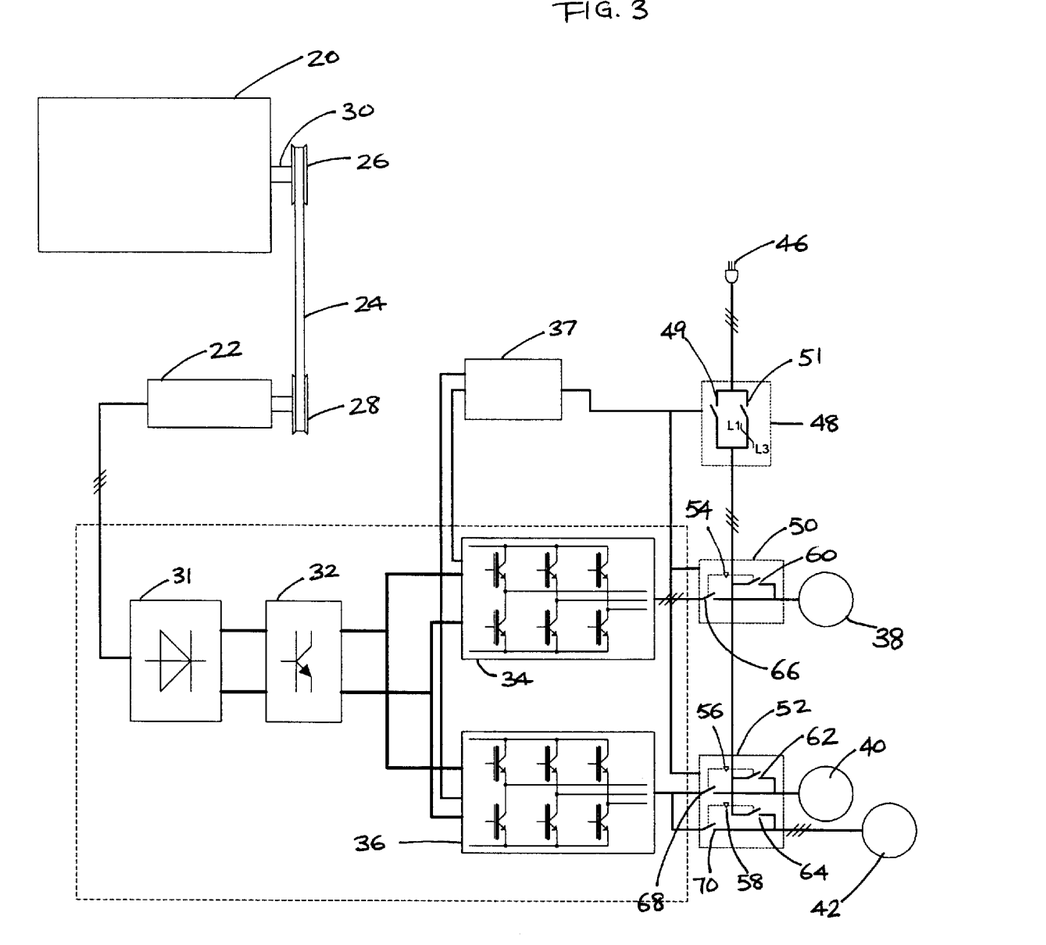
FIG. 3 shows a schematic drawing of the electrical components of a first preferred embodiment of the transport refrigeration unit of FIG. 1.

As shown in FIG. 3, the alternator 22 electrically couples to an input diode rectifier 31 for conversion of the three phase AC power signal to a single direct current ("DC") signal. Because the rectifier 31 is uncontrolled, a DC bus voltage controller 32 is used to control the variable voltage and frequency of the electrical power. In a preferred embodiment, the DC bus voltage controller 32 is an elevator chopper circuit.

A first and second inverter 34, 36, arranged in parallel, receive DC power from the DC bus voltage controller 32. In the parallel arrangement, both inverters 34, 36 receive the same DC voltage and will draw current in proportion to their load. The DC voltage will vary typically in a range from 500 VDC to 700 VDC depending on the engine speed.

Each inverter 34, 36 uses a microprocessor control 37 to regulate its three phase AC output. Under normal operating conditions, when the alternator 22 produces enough power to operate the electrical components of the truck 10 and the transport refrigeration system 14, the inverter output will be maintained at 500 VAC and 75 Hz. While any voltage and frequency could be used, most electric motors in the United States are designed to operate at 460 V and 60 Hz thereby making this their most efficient operating input. If the engine 20 is not supplying sufficient power, such as when the truck is idling, one or both of the inverters output voltage or frequency can be reduced to efficiently use the power that is available. Typically, the inverters 34, 36 are capable of outputting a three phase AC power supply between 360 V at 45 Hz and 500 V at 75 Hz.

The principles by which inverters operate are well-known. A typical inverter uses pulse width modulation ("PWM") to control the voltage and frequency of the AC output. The inverter 34 includes a bank of electronic switches that turn on and off in response to control signals from an inverter controller. By electronic switching, pulses of varying amplitude and duration are produced. The output is a three-phase AC waveform. In many inverters, the AC power is filtered to remove high frequency harmonics, and to produce a sine-wave output.

Figure 4:
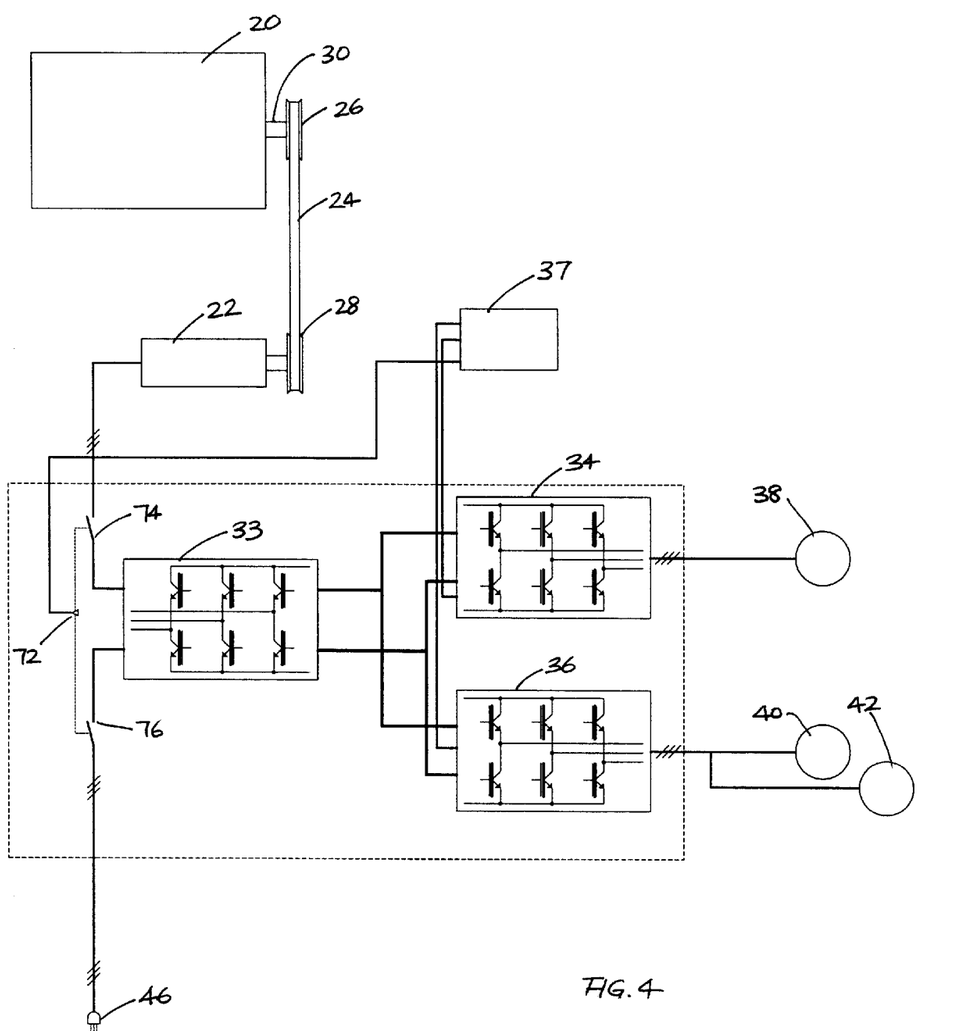
FIG. 4 shows a schematic drawing of the electrical components of a second preferred embodiment of the transport refrigeration unit of FIG. 1.
Figure 5:
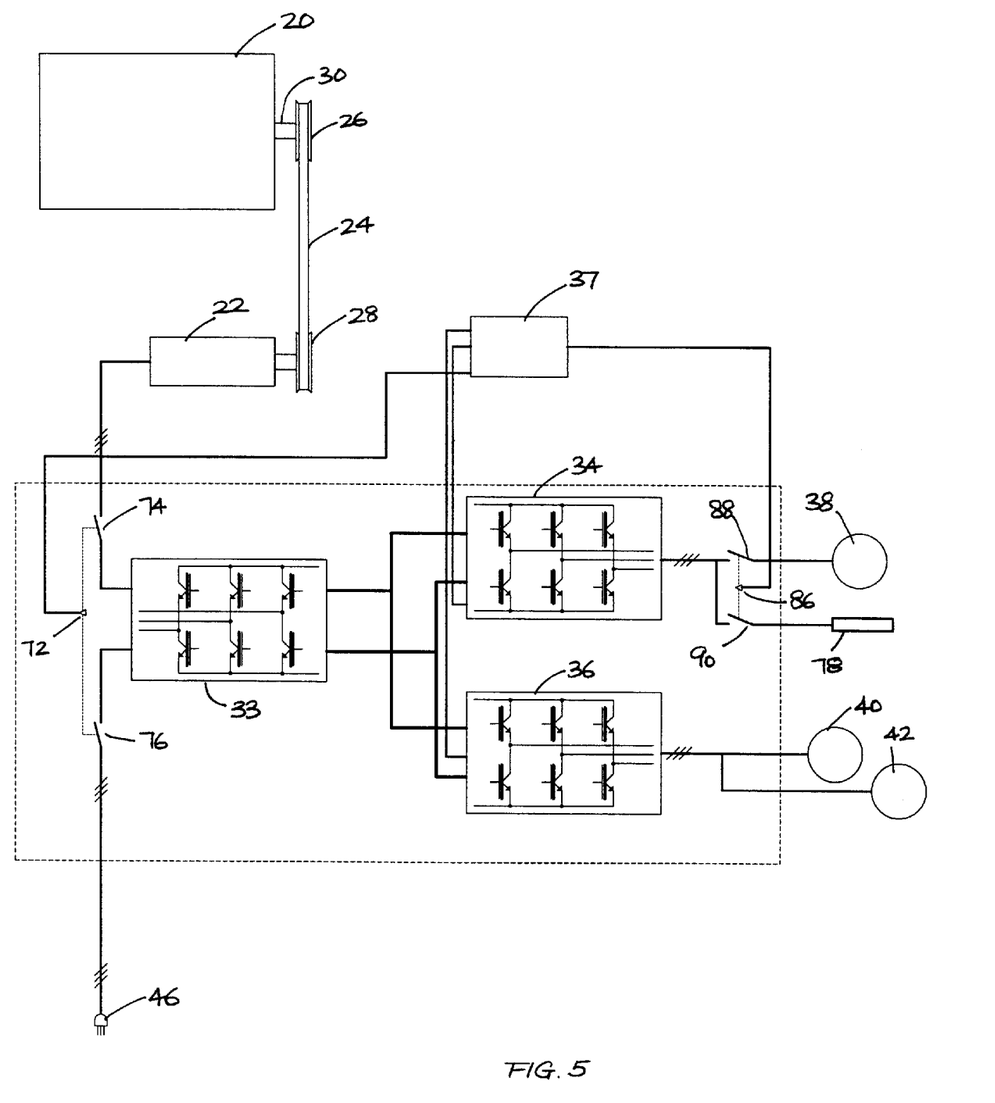
FIG. 5 shows a schematic drawing of the electrical components of a third preferred embodiment of the transport refrigeration unit of FIG. 1.

FIGS. 4–5 show additional preferred embodiments of the present inventive transport refrigeration system. An input inverter bridge with a DC bus voltage control 33 replaces the rectifier 31 and elevator chopper 32 to produce the regulated DC power signal. The input inverter bridge 33 is an inverter with the output terminal coupled to the alternator 22.

The inverters 34, 36 provide numerous advantages to the system described above. First, the transport refrigeration system 14 is more compact because a second prime mover, independent from engine 20, need not be included in the system 14. The electrical operation of the system 14 and the absence of a second prime mover in the system also produce additional benefits such as reduced noise and vibration, and lower emissions.

Second, the multiple-inverter system allows different components in the system 14 to be powered at different voltages and frequencies. While the system 14 operates most efficiently when all of the electric motors are powered at 460 VAC and 60 Hz, this may not be possible at all engine speeds. If the engine 20 is unable to supply sufficient power to maintain this output, the voltage and frequency to certain components can be reduced to maintain the optimum cooling efficiency at different power levels without having to completely shut down components. For example, the compressor power supply could be maintained at 460 VAC and 60 Hz allowing for full load operation of the compressor 38 while the evaporator and condenser fan motor supply voltage and frequency would be reduced to reduce the total power load of the system. In this way, the refrigeration unit 14 can continue to cool with a diminished power supply.

Third, the inverters 34, 36 isolate the alternator 22 from the transport refrigeration unit 14 and regulate the power, such that the power supplied to the unit 14 is no longer synchronous with the alternator 22. Fourth, the inverters 34, 36 are efficient drivers for fans, blowers and compressors. Fans, blowers and compressors are heavily inductive loads, and if connected directly to a power generator would require considerable power factor correction. Frequency inverters electrically coupled to a power generator, by contrast, absorb virtually no reactive power and require no power factor correction. Inverters also eliminate start-up power surges in fans, blowers and compressors.

Furthermore, the use of inverters 34, 36 enables soft start power management. The rate of application of load power to engine 20 influences the drivability of the truck 10. Using an established load application rate, measured in watts per second, minimizes the influence on truck performance. Determination of an acceptable application rate for each truck or rated for all trucks, optimizes the performance of vehicle-powered transport refrigeration unit 14.

FIG. 3 shows the first and second inverters 34, 36 connected in parallel to the DC power supply from the alternator 22. While the first and second inverters 34, 36 are utilized in parallel in the illustrated embodiment, it is contemplated that other numbers of inverters could be utilized. In the illustrated embodiment, the first inverter 34 is configured to power the compressor 38 and the second inverter 36 is configured to power the condenser fan 40 and the evaporator fan 42. While this is the preferred arrangement, it is contemplated that the three refrigeration components that require the most electrical power, namely the compressor 38, condenser fan motor 40, and the evaporator fan motor 42, could be connected in any desired manner. For example, three inverters could be utilized, with the first operating the condenser fan, the second operating the compressor, and the third operating the evaporator fan. Alternatively, two inverters could be used with the condenser fan and the compressor being operated by the first inverter and the evaporator fan being operated by a second inverter. Many different arrangements and combinations are possible and will be readily apparent to those of ordinary skill in the art.

The transport refrigeration unit control 37 is a microprocessor-based control that receives and processes a number of input variables and runs a control algorithm to efficiently manage the power supply and electrical load demands of the system. The control 37 continuously monitors refrigeration unit 14 parameters including alternator speed, refrigeration unit pressure, watt power transducer values, current power transducer, refrigeration system suction pressure value, fixed suction pressure value, and condenser and evaporator discharge temperature to determine the current electrical load of the system. The control algorithm continuously establishes: (1) a position of a suction line proportional refrigeration valve 224 (FIG. 2), which regulates a refrigerant liquid flow rate; and (2) the inverters' 34, 36 output frequency/voltage. Together, these controlled parameters establish the alternator 22 input power. A predetermined, prime mover 20 speed-dependent utilizable power map is incorporated in the control algorithm. The alternator's input power consumption is made equivalent to the prime mover speed-dependent utilizable power map.

In operation, the control 37 can sense that no cooling is required and shut off the refrigeration components. The control 37 can also determine that a cooling cycle is necessary and that sufficient power is available to run all of the components at their most efficient point. The control 37 will signal the inverters 34, 36 to maintain 60 Hz at 460 VAC.

In another example, the control 37 can sense that the power output of the engine 20 is insufficient to run all the components and that cooling is required. The control 37 can use the available power to operate the compressor 38 at its design point while operating the condenser fan 40 and evaporator fan 42 at a lower voltage or frequency using whatever power may remain. While this would not provide the most cooling, it will provide some cooling given the limited available power output of the truck engine. If the engine 20 suddenly begins outputting more power, the control 37 will sense this and adjust the first and second inverters 34, 36 accordingly. In addition, the first and second inverters 34, 36 can supply power at a frequency and voltage that is higher than the design point of the electrical components allowing them to operate at a capacity higher than their design point.

The control algorithm also controls the refrigeration unit high side refrigerant pressure at extreme conditions. A high pressure control set point is input into a control algorithm. Rising refrigerant pressure results in changing the compressor speed with Proportional Integral Derivative ("PID") control to limit the pressure to the set point value. Further required reduction in refrigerant pressure uses a suction line PID controlled refrigerant valve 224. Other unit performance parameters are continuously monitored to allow for further changes in compressor speed or refrigeration unit suction flow. The control algorithm prevents exceeding the refrigeration pressure set point limit and shut down of the refrigeration system is avoided.

Transport refrigeration units, such as the system of the present invention shown in FIG. 3, often require auxiliary power to maintain the load space at a desired temperature when the engine 20 is not operating or when the cab 18 and the load space 12 are separated, such as when the truck parks at a terminal. To facilitate this, the present inventive transport refrigeration unit is adapted to use a standby power supply 46. The standby supply 46 is three phase 460 VAC 60 Hz power from an electrical grid. An automatic phase correction ("APC") module 48 employs a first and second switch 49, 51 to ensure that the three phase AC power supplied by the electrical grid is in the proper phase. APC module 48 detects the phase sequence of the AC power and opens and/or closes the first and second switches 49, 51 as required to maintain the power supplied to the compressor 38, condenser fan 40 and evaporator fan 42 in the proper phase.

A first set of contactors 50 switches between the first inverter 34 supply and standby supply 46 to power the compressor 38 and a second set of contactors 52 switches between the second inverter 36 supply and the standby supply 46 to power the condenser fan 40 and evaporator fan 42. No control of the standby supply 46 or of the various components is necessary as the standby supply 46 is capable of operating all of the components at their design points.

When it is desired to switch to the standby power supply 46, the control 37 signals a first, second and third contactor control 54, 56, 58, to close a first series of contactors 60, 62, 64 and connect the standby power supply 46 to the refrigeration unit components, while simultaneously opening a second series of contactors 66, 68 and 70 to disconnect the first inverter 34 and the compressor, and disconnect the second inverter 36 and the condenser fan 40 and evaporator fan 42.

Figure 6:
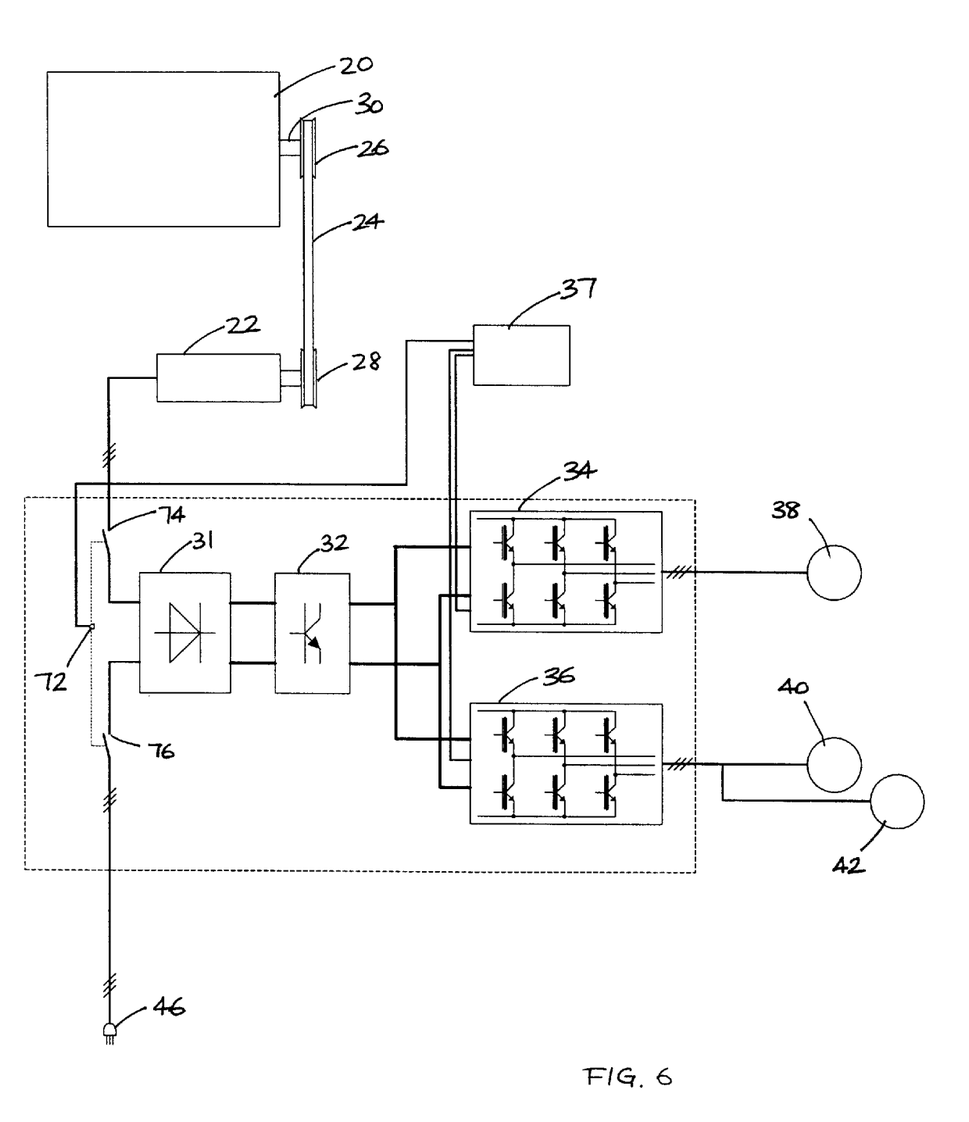
FIG. 6 shows a schematic drawing of the electrical components of a fourth preferred embodiment of the transport refrigeration unit of FIG. 1.

FIGS. 4 and 6 show additional preferred embodiments of the present invention where the standby power supply 46 electronically couples to the compressor 38, condenser fan 40 and evaporator fan 42 via the DC bus controller 33. When it is desired to switch to the standby power supply 46, the control 37 signals contactor control 72 to close a first contactor 76, to connect the standby power supply 46 to the refrigeration unit components, while simultaneously opening a second contactor 74, disconnecting alternator 22 and the DC bus controller 33.

Figure 7:
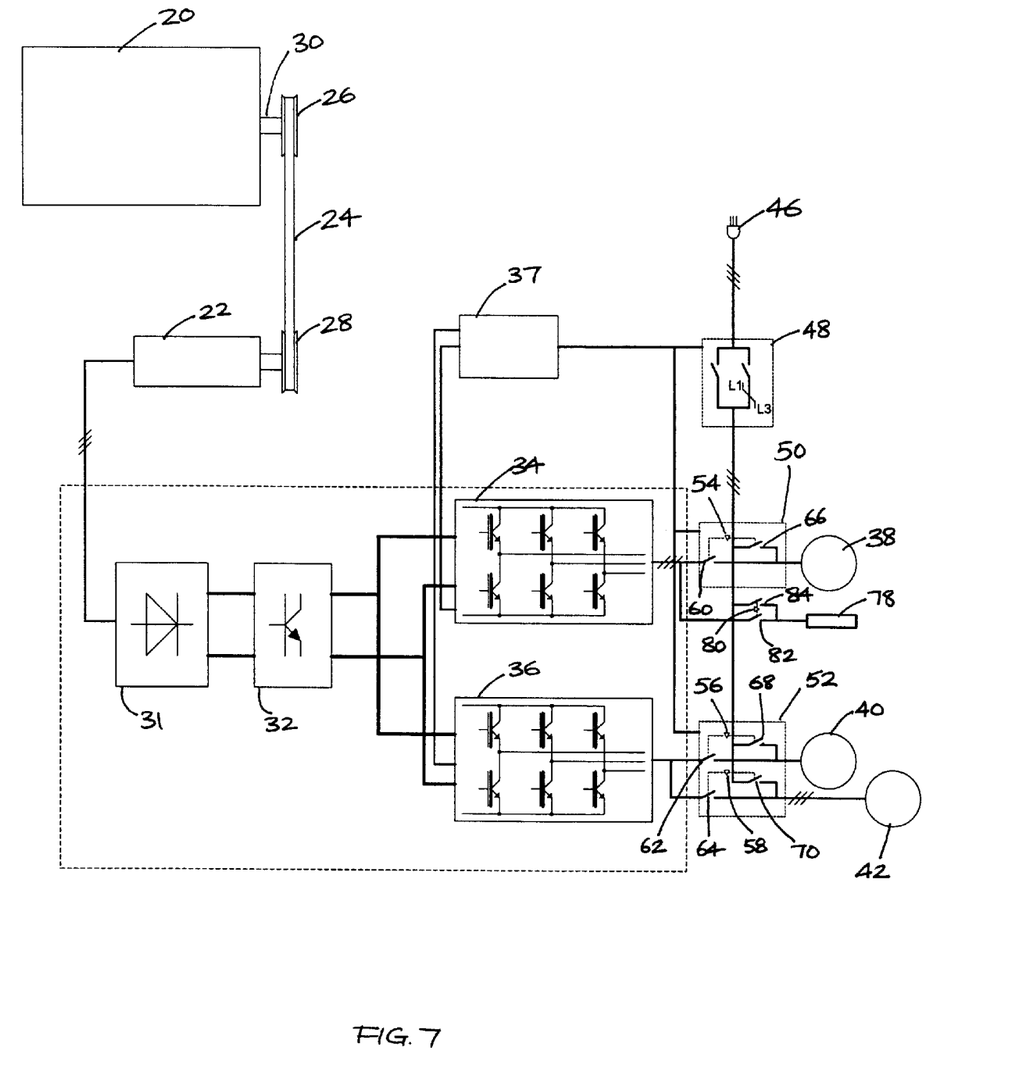
FIG. 7 shows a schematic drawing of the electrical components of a fifth preferred embodiment of the transport refrigeration unit of FIG. 1.
Figure 8:
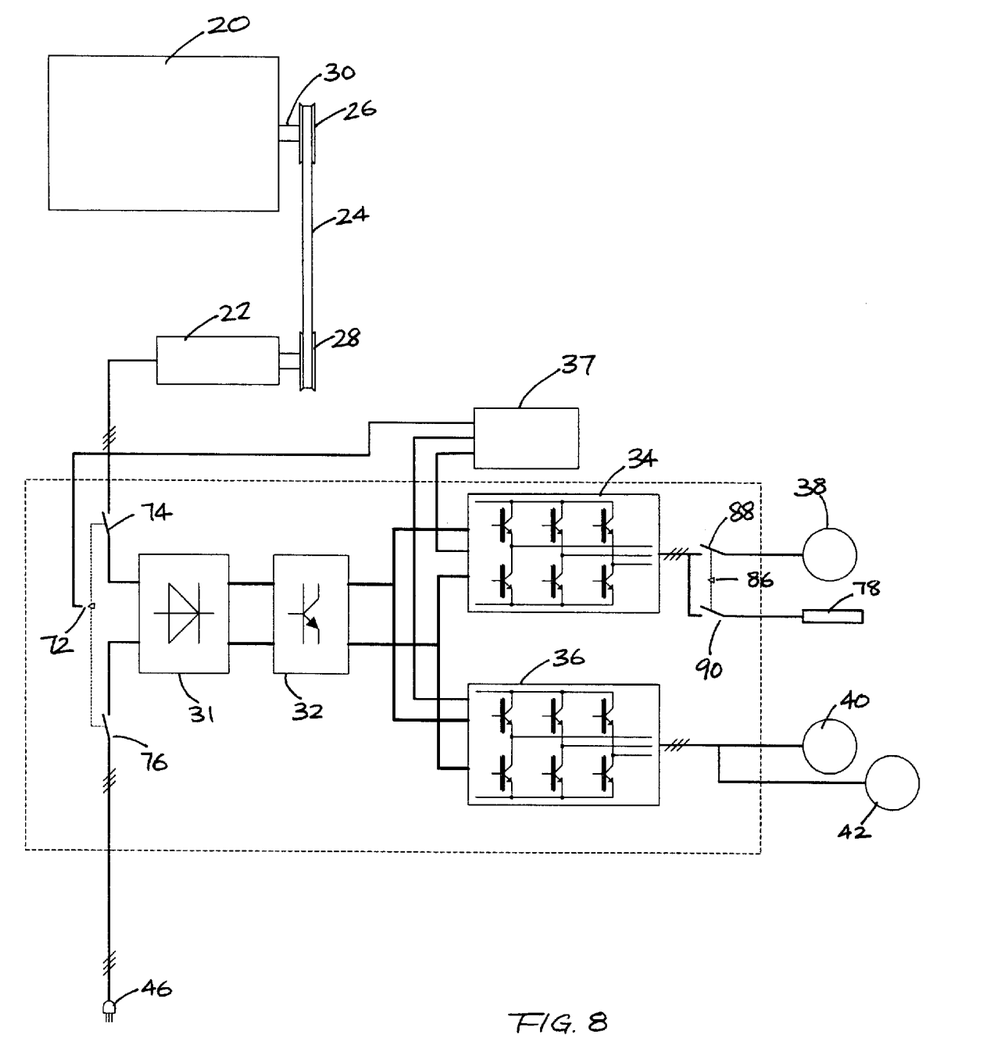
FIG. 8 shows a schematic drawing of the electrical components of a sixth preferred embodiment of the transport refrigeration unit of FIG. 1.

FIGS. 5, 7, and 8 show additional preferred embodiments of the present invention where an electric heater 78 electrically couples to the first inverter 34. The embodiments shown in FIGS. 5 and 8 include a contactor control 86 and a first and second contactor 88, 90. When the control 37 determines that a cooling cycle is necessary, the control 37 signals the contactor control 86 to close the first contactor 88 connecting the compressor 38 and first inverter 34, while simultaneously opening the second contactor 90 to disconnect the electric heater 78 from first inverter 34. When the control 37 determines that a heating cycle is necessary, the control 37 signals the contactor control 86 to close the second contactor 90, connecting the electric heater 78 and the first inverter 34, while simultaneously opening the first contactor 88 to disconnect the compressor 38 from first inverter 34. Situations requiring a heat cycle may include defrosting of the condenser coil or heating of the load space. If the control 37 determines that neither a cooling cycle nor a heat cycle is required, the control 37 may signal contactor control 86 to open the first and second contactors 88, 90 to disconnect the compressor 38 and electric heater 78 and the first inverter 34.

FIG. 7 shows an embodiment of the present invention where the control 37 can signal the contact control 80 to: (1) close the first contactor 82, to connect the electric heater 78 and first inverter 34, while simultaneously opening the second contactor 84, to disconnect the electric heater 78 and the standby power supply 46; (2) close the second contactor 84, to connect the electric heater 78 and the standby power supply 46, while simultaneously opening the first contactor 82, to disconnect the electric heater 78 and the first inverter 34; or (3) open the first and second contactors 82, 84 when the control 37 determines that a heat cycle is not required. Additionally, the control 37 can signal the contactor control 54 to: (1) close the first contactor 60, to connect the compressor 38 and first inverter 34, while simultaneously opening the second contactor 66, to disconnect the compressor 38 and the standby power supply 46; (2) close the second contactor 66, to connect the compressor 38 and the standby power supply 46, while simultaneously opening the first contactor 60, to disconnect the compressor 78 and the first inverter 34; or (3) open the first and second contacts 60, 66 when the control 37 determines that a cooling cycle is not required.

Various features and advantages of the invention are set forth in the following claims.

What is claimed is:

1. A method of controlling a refrigeration system comprising:

providing a mover;

providing an alternator, the alternator being coupled to the mover and generating a power signal;

monitoring at a control a plurality of system parameters and sending a control signal based on the system parameters from the control;

receiving the power signal and the control signal at an inverter-based device, the inverter-based device having a plurality of inverters and converting the power signal into a controlled power signal based on the control signal; and driving a plurality of components of the refrigeration system with the controlled power signal, the components also being controlled by the control.

2. The method of claim 1, further comprising providing a controlled valve, the controlled valve regulating a refrigerant based on signals from the control, the control valve having a position, and wherein the inverter-based device has an output frequency and an output voltage.

3. The method of claim 2, further comprising:

determining a refrigerant pressure;

providing a high pressure control set point;

changing a compressor speed such that the refrigerant pressure is approximately the high pressure control set point when the refrigerant pressure rises;

sending the control signal from the control to the controlled valve;

establishing a second output frequency at the inverter-based device;

establishing a second output voltage at the inverter-based device; and using the control signal to establish a second position at the controlled valve.

4. The method of claim 2, further comprising:

measuring an alternator speed;

determining a plurality of refrigeration system pressure values;

sending the control signal based on the alternator speed and the system pressure values;

establishing a second output frequency at the inverter-based device;

establishing a second output voltage at the inverter-based device; and using the control signal to establish a second position at the controlled valve.

5. The method of claim 2, further comprising:

measuring an alternator speed;

determining a plurality of transducer values;

sending the control signal based on the alternator speed and the transducer values;

establishing a second output frequency at the inverter-based device;

establishing a second output voltage at the inverter-based device; and using the control signal to establish a second position at the controlled valve.

6. The method of claim 2, further comprising:

measuring an alternator speed;

determining a fixed suction pressure value;

sending the control signal based on the alternator speed and the fixed suction pressure value;

establishing a second output frequency at the inverter-based device;

establishing a second output voltage at the inverter-based device; and using the control signal to establish a second position at the controlled valve.

7. The method of claim 2, further comprising:

measuring an alternator speed;

determining a condenser and evaporator discharge temperature;

sending the control signal based on the alternator speed and the temperature;

establishing a second output frequency at the inverter-based device;

establishing a second output voltage at the inverter-based device; and using the control signal to establish a second position at the controlled valve.

8. A method of power distribution in a temperature controlled transport system comprising:

providing a primary power signal;

converting the primary power signal into a secondary controlled power signal with a plurality of inverters, the inverters being coupled to a control, the control sending control signals to the inverters; and driving a plurality of components in the temperature controlled system with the controlled power signal, the components also being controlled by the control.

9. The method of claim 8, further comprising providing a controlled valve, the controlled valve regulating a refrigerant based on signals from the control, the control valve having a position, and wherein each inverter has an output frequency and an output voltage.

10. The method of claim 9, further comprising:
determining a refrigerant pressure;
providing a high pressure control set point;
changing a compressor speed when the refrigerant pressure rises such that the refrigerant pressure is approximately the high pressure control set point;
sending a control signal from the control to the controlled valve;
establishing a second output frequency at the inverters;
establishing a second output voltage at the inverters; and
using the control signal to establish a second position at the controlled valve.

11. The method of claim 9, further comprising:
determining an alternator speed;
determining a plurality of temperature controlled system pressure values;
sending a control signal based on the alternator speed and the system pressure values;
establishing a second output frequency at the inverters;
establishing a second output voltage at the inverters; and
using the control signal to establish a second position at the controlled valve.

12. The method of claim 9, further comprising:
determining an alternator speed;
determining a plurality of transducer values;
sending a control signal based on the alternator speed and the transducer values;
establishing a second output frequency at the inverters;
establishing a second output voltage at the inverters; and
using the control signal to establish a second position at the controlled valve.

13. The method of claim 9, further comprising:
determining an alternator speed;
determining a fixed suction pressure value;
sending a control signal based on the alternator speed and the fixed suction pressure value;
establishing a second output frequency at the inverters;
establishing a second output voltage at the inverters; and
using the control signal to establish a second position at the controlled valve.

14. The method of claim 9, further comprising:
measuring an alternator speed;
determining a condenser and evaporator discharge temperature;
sending a control signal based on the alternator speed and the temperature;
establishing a second output frequency at the inverters;
establishing a second output voltage at the inverters; and
using the control signal to establish a second position at the controlled valve.

15. A power distribution system in a temperature controlled transport system, the system comprising:
a mover being operatively coupled to an alternator, the alternator generating a power signal;
a control, the control monitoring a plurality of system parameters and sending a control signal based on the system parameters;
an inverter-based device operatively coupled to the control, the inverter-based device having a plurality of inverters, receiving the power signal and the control signal, and converting the power signal into a controlled power signal based on the control signal; and
a plurality of components, the components being driven with the controlled power signal and being controlled by the control.

16. The system of claim 15, wherein the inverter-based device has an output frequency and an output voltage, further comprises a controlled valve, the controlled valve regulating a refrigerant and having a position.

17. The system of claim 16, wherein the refrigerant has a refrigerant pressure, and further comprising a compressor, the compressor having a compressor speed, the compressor speed being changed such that the refrigerant pressure is approximately equal to a high pressure control set point when the refrigerant pressure rises, and the position of the controlled valve being adjusted based on the control signal.

18. The system of claim 16, further comprising a plurality of temperature controlled system pressure transducers, each pressure transducer determining a pressure value, and establishing a second position at the controlled valve based on the pressure values and an alternator speed.

19. The system of claim 16, further comprising a suction pressure transducer, the pressure transducer determining a pressure value, and establishing a second position at the controlled valve based on the pressure value and an alternator speed.

20. The system of claim 16, further comprising a condenser and evaporator discharge, the discharge having a temperature, and establishing a second position at the controlled valve based on the temperature and an alternator speed.

* * * * *

UNITED STATES PATENT AND TRADEMARK OFFICE
CERTIFICATE OF CORRECTION

PATENT NO.     : 6,622,505 B2
DATED          : September 23, 2003
INVENTOR(S)    : Eugene Thomas Anderson et al.

It is certified that error appears in the above-identified patent and that said Letters Patent is hereby corrected as shown below:

<u>Title page,</u>
Item [54], Title, "INVERTOR" should be -- INVERTER --.

Signed and Sealed this

Twentieth Day of January, 2004

JON W. DUDAS
*Acting Director of the United States Patent and Trademark Office*